(12) United States Patent
Ishida et al.

(10) Patent No.: US 9,816,891 B2
(45) Date of Patent: Nov. 14, 2017

(54) GAS INTERNAL COMBUSTION ENGINE GAS LEAK CHECKING DEVICE AND METHOD FOR SAME

(71) Applicant: Mitsubishi Heavy Industries, Ltd., Toyko (JP)

(72) Inventors: Michiyasu Ishida, Tokyo (JP); Hirotoshi Kitagawa, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 13 days.

(21) Appl. No.: 14/779,949

(22) PCT Filed: Feb. 19, 2014

(86) PCT No.: PCT/JP2014/053832
§ 371 (c)(1),
(2) Date: Sep. 24, 2015

(87) PCT Pub. No.: WO2014/156376
PCT Pub. Date: Oct. 2, 2014

(65) Prior Publication Data
US 2016/0061685 A1    Mar. 3, 2016

(30) Foreign Application Priority Data

Mar. 29, 2013    (JP) .................................. 2013-073839

(51) Int. Cl.
*F23N 5/24* (2006.01)
*F02D 19/02* (2006.01)
(Continued)

(52) U.S. Cl.
CPC ........... *G01M 3/025* (2013.01); *F02D 19/025* (2013.01); *F02D 19/027* (2013.01);
(Continued)

(58) Field of Classification Search
CPC ...... F02B 43/00; F02D 19/022; F02D 19/025; F02D 19/027; F02D 2041/226;
(Continued)

(56) References Cited

U.S. PATENT DOCUMENTS 5,649,818 A * 7/1997 Day .................... F23N 5/206
                                                                431/6
5,827,950 A * 10/1998 Woodbury .............. F23N 5/242
                                                                431/16
(Continued)

FOREIGN PATENT DOCUMENTS

CA       2731023      2/2015
CN    101014764 A     8/2007
(Continued)

OTHER PUBLICATIONS

First Office Action, Japanese App. No. 2013-073839, dated Jul. 13, 2016, 8 Pages.
(Continued)

*Primary Examiner* — Randy Gibson
*Assistant Examiner* — Gedeon M Kidanu
(74) *Attorney, Agent, or Firm* — Berkeley Law & Technology Group, LLP

(57) ABSTRACT

An object of the present invention is to provide a gas leakage checking device and a method for the same, for checking fuel-gas leakage of safety shutoff valves simply and securely by measuring a pressure in a fuel supply pipe. The gas-leakage checking device 8 includes a first safety shutoff valve 81 disposed in a fuel-gas supply pipe 89 of the gas internal combustion engine 1 for permitting or shutting off a flow of the fuel gas, a second safety shutoff valve 82 disposed on a downstream side of the first safety shutoff valve 81, a gas-leakage checking pipe 89c branched from between the first and second safety shutoff valves 81, 82, a (Continued)

gas-discharge valve 83 disposed in the gas-leakage checking pipe 89c and configured to discharge the fuel gas between the first and second safety shutoff valves 81, 82, a first pressure meter P1 for detecting a pressure of the fuel gas in the gas-leakage checking pipe 89c, and second pressure meters P2, P3 disposed on a downstream side of the second safety shutoff valve 82, for detecting the pressure of the fuel gas in the fuel-gas supply pipe 89.

3 Claims, 5 Drawing Sheets

(51) Int. Cl.
*G01M 3/02* (2006.01)
*F23K 5/00* (2006.01)
*F02M 21/02* (2006.01)
*G01M 15/09* (2006.01)

(52) U.S. Cl.
CPC .... *F02M 21/0242* (2013.01); *F02M 21/0293* (2013.01); *F23K 5/007* (2013.01); *F23N 5/242* (2013.01); *G01M 15/09* (2013.01); *F23K 2900/05001* (2013.01); *F23N 2031/18* (2013.01); *Y02T 10/32* (2013.01)

(58) Field of Classification Search
CPC ............ F02D 41/0027; F02M 21/0215; F02M 21/0242; F02M 21/0278; F02M 25/0809; F02M 2025/0845; F02M 25/0836; F02M 25/0827; F23N 2031/18; F23N 5/242; G01F 17/00; G01M 3/3236; G01M 3/3263
USPC ............................ 73/40.5 R; 123/198 D, 529
See application file for complete search history.

(56) References Cited

U.S. PATENT DOCUMENTS

| | | | | |
|---|---|---|---|---|
| 6,390,075 B1* | 5/2002 | Yamazaki | .......... | F02M 21/0242 |
| | | | | 123/529 |
| 6,401,698 B1* | 6/2002 | Yamazaki | .......... | F02D 41/0027 |
| | | | | 123/529 |
| 6,892,712 B2* | 5/2005 | Miwa | ................. | F02M 25/0809 |
| | | | | 123/198 D |
| 8,813,470 B2* | 8/2014 | Engesser | ................ | F02C 7/232 |
| | | | | 60/39.094 |
| 2001/0032628 A1* | 10/2001 | Goto | ....................... | F02B 43/00 |
| | | | | 123/529 |
| 2011/0067487 A1* | 3/2011 | Haag | ................ | B60K 15/03504 |
| | | | | 73/40 |
| 2011/0214742 A1 | 9/2011 | Izutani et al. | | |

FOREIGN PATENT DOCUMENTS

| | | |
|---|---|---|
| EP | 2365238 | 9/2011 |
| EP | 2549092 A1 | 1/2013 |
| JP | 5381180 | 7/1978 |
| JP | 02179435 A | 7/1990 |
| JP | 2179437 | 7/1990 |
| JP | 5248269 A | 9/1993 |
| JP | 5321671 | 12/1993 |
| JP | 7145928 | 6/1995 |
| JP | 9242614 | 9/1997 |
| JP | 2000303909 A | 10/2000 |
| JP | 200141106 | 2/2001 |
| JP | 2001304000 | 10/2001 |
| JP | 2002013418 A | 1/2002 |
| JP | 2004177275 A | 6/2004 |
| JP | 200617657 | 1/2006 |
| JP | 2008026016 A | 2/2008 |
| JP | 2009203952 | 9/2009 |
| JP | 2010270948 A | 12/2010 |
| JP | 2011186528 | 9/2011 |
| JP | 2012172657 | 9/2012 |
| JP | 2012207629 A | 10/2012 |
| WO | 2014156376 A1 | 10/2014 |

OTHER PUBLICATIONS

SIPO, First Office Action, App. No. 201480012212.X, dated Jun. 3, 2016, 11 Pages.
EPO, European Search Report, App. No. 14775095.4, dated Feb. 29, 2016, 5 Pages.
PCT/JP2014/053832: International Preliminary Report on Patentability, English translation, mailed Oct. 8, 2015, 8 pages.
CN104736827/201280076598: First Office Action, English translation, Oct. 10, 2015.
Decision to Grant a Patent, App. No. JP2013-073839, Drafting Date Dec. 1, 2016, dated Dec. 9, 2016, 6 Pages.
Notification Concerning Submission, Obtention or Transmittal of Priority Document, App. No. PCT/JP2014/053832, Filed Feb. 19, 2014, dated Apr. 10, 2014, 1 Page.

\* cited by examiner

FIG.4

Legend: O: NO GAS LEAKAGE  △: GAS LEAKAGE CANNOT BE DETERMINED  ×: GAS LEAKAGE

| CHECK OPERATION | 1st SAFETY SHUTOFF VALVE 81 | 2nd SAFETY SHUTOFF VALVE 82 | GAS-DISCHARGE VALVE 83 | 1st PRESSURE METER P1 | 2nd PRESSURE METER P2 | 3rd PRESSURE METER P3 | DETERMINATION 1st SAFETY SHUTOFF VALVE | 2nd SAFETY SHUTOFF VALVE | GAS-DISCHARGE VALVE |
|---|---|---|---|---|---|---|---|---|---|
| 1st OPERATION — GAS-DISCHARGE VALVE OPEN→CLOSE | CLOSED | CLOSED | CLOSED | ↑ (SAME) | ↑ | ↑ | O | △ | △ |
|  | " | " | " | ↗ (PRESSURE INCREASE) | ↑ | ↑ | × | O | △ |
|  | " | " | " | ↘ (PRESSURE DECREASE) | ↗ | ↗ | × | × | △ |
| 2nd OPERATION — 1st SAFETY SHUTOFF VALVE CLOSE→OPEN | OPEN | CLOSED | CLOSED | ↑ | ↑ | ↑ | — | O | O |
|  | " | " | " | ↗ | ↗ | ↗ | — | × | △ |
| 3rd OPERATION — 1st SAFETY SHUTOFF VALVE OPEN→CLOSE | CLOSED | CLOSED | CLOSED | ↑ | ↑ | ↑ | — | O | × |
|  | " | " | " | ↑ | ↑ | ↑ | O | O | O |
|  | " | " | " | ↗ | ↑ | ↑ | O | O | × |
|  | " | " | " | ↗ | ↗ | ↗ | O | × | O |

GAS INTERNAL COMBUSTION ENGINE GAS LEAK CHECKING DEVICE AND METHOD FOR SAME

TECHNICAL FIELD

The present invention relates to a gas leakage checking device and a method for the same, for checking leakage of safety shutoff valves in a fuel-gas supply circuit before startup of a precombustion-chamber type lean premixed gas internal combustion engine.

BACKGROUND ART

In a precombustion-chamber type lean premixed gas internal combustion engine (hereinafter, referred to as a gas engine), to secure supply and safety of the fuel gas, a variety of devices, valves, and the like are provided.

Unpredictable leakage of the fuel gas may occur from the above devices, valves, and the like.

Fuel gas having leaked from the above devices, valves, and the like may flow to and accumulate in each of the gas engine, an exhaust channel, and the like.

If the gas engine is ignited and started under such a condition, the accumulating fuel gas undergoes abnormal combustion and damages the gas engine, the exhaust channel, and the like.

Patent Document 1 discloses a gas leakage checking device.

With reference to FIG. 5, a gas supply pipe 07 for supplying fuel gas to a gas burner 05 includes the first and second on-off valves 081, 082 disposed in series, and a proportional electromagnetic valve 09 disposed on the downstream side of the first and second on-off valves 081, 082. The above first and second on-off valves 081, 082 open when supplied with power, and close when not supplied with power due to a biasing force of a spring so as to shut off supply of fuel gas to the gas burner 05.

The proportional electromagnetic valve 09 adjusts the amount of fuel gas supply to the gas burner 05.

The gas burner 05 includes a spark electrode 010a that discharges sparks as an igniter 010 operates, and a thermocouple 011 serving as a flame-detection element for detecting flame of the gas burner 05.

Further, a controller 013 is provided, which controls operation of a fan motor 03a for driving a fan 03, the first and second on-off valves 081, 082, the proportional electromagnetic valve 09, the igniter 010, and the like.

To check gas leakage, the proportional electromagnetic valve 09 is maintained to be opened for a predetermined period of time or more when an operation switch is turned off, the rotation speed of the fan 03 is reduced to the lower-limit rotation speed within the normal operation range, and the igniter 010 is started.

Then, the first on-off valve 081 is opened, and the second on-off valve 082 is closed. Next, the first on-off valve 081 is closed, and the second on-off valve 082 is opened.

After elapse of a predetermined period of time, whether the gas burner 05 is put out is determined on the basis of the output of the thermocouple 011. As a result of the above series of control, check of the first on-off valve 081 is completed.

To check the second on-off valve 082, the first on-off valve 081 is closed, and the second on-off valve 082 is opened. Next, the first on-off valve 081 is opened, and the second on-off valve 082 is closed.

After elapse of a predetermined period of time, whether the gas burner 05 is put out is determined on the basis of the output of the thermocouple 011. As a result of the above series of control, check of the second on-off valve 082 is completed.

As a result of the two sets of control, check of the first and second on-off valves 081, 082 is completed.

CITED REFERENCES

Patent Literature

Patent Document 1: JP2010-270948A

SUMMARY

Problems to be Solved

According to Patent Document 1, whether the gas burner 05 is put out is determined on the basis of the output of the thermocouple 011 to determine that there is no gas leakage at the first and second on-off valves 081, 082.

However, to perform combustion of fuel gas, concentration of the fuel gas with respect to air needs to be in a certain range.

Thus, when concentration of the fuel gas is in the combustion range or less, it is wrongly determined that there is no gas leakage from the first and second on-off valves 081, 082.

If fuel gas flows to the gas engine itself and the exhaust pipe while the concentration of the fuel gas is in the combustion range or less and gas is leaking, the fuel gas would accumulate therein, and the concentration of the fuel gas would rise with time.

In such a state, if ignition startup of the gas engine is performed, abnormal combustion occurs in the gas engine itself and the exhaust channel, which may cause a trouble such as breakage.

The present invention was made in view of the above issues, and an object of the present invention is to provide a gas leakage checking device and a method for the same, for checking fuel-gas leakage of safety shutoff valves simply and securely by measuring a pressure in a fuel supply pipe.

Solution to the Problems

To achieve the above object, the present invention can provide a gas-leakage checking device for a gas internal combustion engine, including: a fuel-gas supply pipe for supplying fuel gas to a combustion chamber of the gas internal combustion engine; a first safety shutoff valve disposed in the fuel-gas supply pipe for permitting or shutting off a flow of the fuel gas; a second safety shutoff valve disposed in the fuel-gas supply pipe on a downstream side of the first safety shutoff valve at a distance from the first safety shutoff valve; a gas-leakage checking pipe branched from the fuel-gas supply pipe between the first safety shutoff valve and the second safety shutoff valve; a gas-discharge valve disposed in the gas-leakage checking pipe and configured to discharge the fuel gas between the first safety shutoff valve and the second safety shutoff valve; a first pressure meter disposed on an upstream side of the gas-discharge valve and configured to detect a pressure of the fuel gas; and a second pressure meter disposed on a downstream side of the second safety shutoff valve and configured to detect the pressure of the fuel gas in the fuel-gas supply pipe.

According to the present invention, the pressure between the first and second safety shutoff valves and the pressure at the downstream side of the second safety shutoff valve are detected, which makes it possible to check a trouble of the first and second safety shutoff valves and the gas-charge valve, and to improve the reliability of the gas engine.

Further, preferably in the present invention, the gas leakage checking device may further include: a control device configured to open and close the first safety shutoff valve, the second safety shutoff valve, and the gas-discharge valve in a set order; and a starting switch for starting the control device.

The control device is configured to operate, on the basis of operation of the starting switch, a first operation unit for checking fuel-gas leakage of the first safety shutoff valve, a second operation unit for checking the fuel-gas leakage of the second safety shutoff valve and the gas-discharge valve, and a third operation unit for checking the fuel-gas leakage of the first safety shutoff valve, the second safety shutoff valve, and the gas-discharge valve, in sequence.

According to the present invention, on the basis of operation of a starting switch, the control device operates each safety valve and the gas-discharge valve on the basis of a set procedure, which makes it possible to prevent check errors and the like due to operational errors and to improve reliability upon startup of the gas engine.

Further, since the control device is started using a manual switch, the startup can be performed optionally, which makes it possible to improve reliability of the gas engine.

Further, preferably in the present invention, the gas internal combustion engine is a gas internal combustion engine, the fuel-gas supply pipe being branched at a downstream side of the second safety shutoff valve into a main-chamber supply pipe for supplying the fuel gas to a main chamber of the combustion chamber and a precombustion-chamber supply pipe for supplying the fuel gas to a precombustion chamber of the combustion chamber, and the second pressure meter including a main pressure meter and an auxiliary pressure meter.

The main-chamber supply pipe includes a main pressure-adjustment valve for adjusting the pressure of the fuel gas supplied to the main chamber, the main pressure meter being disposed on a downstream side of the main pressure-adjustment valve.

The precombustion-chamber supply pipe includes an auxiliary pressure-adjustment valve for adjusting the pressure of the fuel gas supplied to the precombustion chamber, the auxiliary pressure meter being disposed on a downstream side of the auxiliary pressure-adjustment valve.

According to the present invention, the main pressure meter and the auxiliary pressure meter are used as pressure meters by the pressure-adjustment valves for adjusting a pressure of fuel gas that is to be supplied to the main chamber and the precombustion chamber of the combustion chamber, and for checking leakage of the fuel gas at the second safety shutoff valve. As a result, it is possible to improve safety upon startup of the gas engine and to restrict an increase in the cost of the fuel-leakage checking device.

Further, in the present invention, it is possible to provide a method of checking gas leakage of a gas internal combustion engine which includes: a fuel-gas supply pipe for supplying fuel gas to a combustion chamber of the gas internal combustion engine; a first safety shutoff valve disposed in the fuel-gas supply pipe; a second safety shutoff valve disposed on a downstream side of the first safety shutoff valve at a distance from the first safety shutoff valve; a gas-discharge valve disposed between the first safety shutoff valve and the second safety shutoff valve and configured to discharge the fuel gas between the first safety shutoff valve and the second safety shutoff valve; a first pressure meter disposed on an upstream side of the gas-discharge valve and configured to detect a pressure of the fuel gas; and a second pressure meter disposed on a downstream side of the second safety shutoff valve and configured to detect the pressure of the fuel gas in the fuel-gas supply pipe. The method includes: a first operation step of checking fuel-gas leakage of the first safety shutoff valve by operating the gas-discharge valve from an open state to a closed state and maintaining the first and second safety shutoff valves to be in a closed state; a second operation step of checking the fuel-gas leakage of the second safety shutoff valve and the gas-discharge valve by operating the first safety shutoff valve from a closed state to an open state and maintaining the second safety shutoff valve and the gas-discharge valve to be in a closed state; and a third operation step of checking the fuel-gas leakage of the first safety shutoff valve, the second safety shutoff valve, and the gas-discharge valve by operating the first safety shutoff valve from an open state to a closed state and maintaining the second safety shutoff valve and the gas-discharge valve to be in a closed state.

Further, preferably in the present invention, the first operation step, the second operation step, and the third operation step are performed in response to operation to switch on a starting switch for starting a control device configured to open and close the first safety shutoff valve, the second safety shutoff valve, and the gas-discharge valve on the basis of a set order.

According to the present invention, double cross check is performed to determine leakage of gas fuel of the first safety shutoff valve, the second safety shutoff valve, and the gas-discharge valve disposed in the fuel supply circuit of the gas internal combustion engine. In this way, non-combusted gas is prevented from accumulating in the gas engine and the exhaust channel when the gas engine is restarted after shutdown, which makes it possible to prevent abnormal combustion thereof.

Advantageous Effects

According to the present invention, it is possible to provide a gas leakage checking device of a gas internal combustion engine and a method for the same, for checking fuel-gas leakage of safety shutoff valves simply and securely by measuring a pressure in a fuel supply pipe.

BRIEF DESCRIPTION OF DRAWINGS

FIG. 4 is a diagram of determination of gas leakage by a fuel-gas leakage detection unit according to the present invention.

DETAILED DESCRIPTION

Embodiments of the present invention will now be described in detail with reference to the accompanying drawings.

It is intended, however, that unless particularly specified, dimensions, materials, shapes, relative positions and the like of components described in the embodiments shall be interpreted as illustrative only and not limitative of the scope of the present invention.

Figure 1:
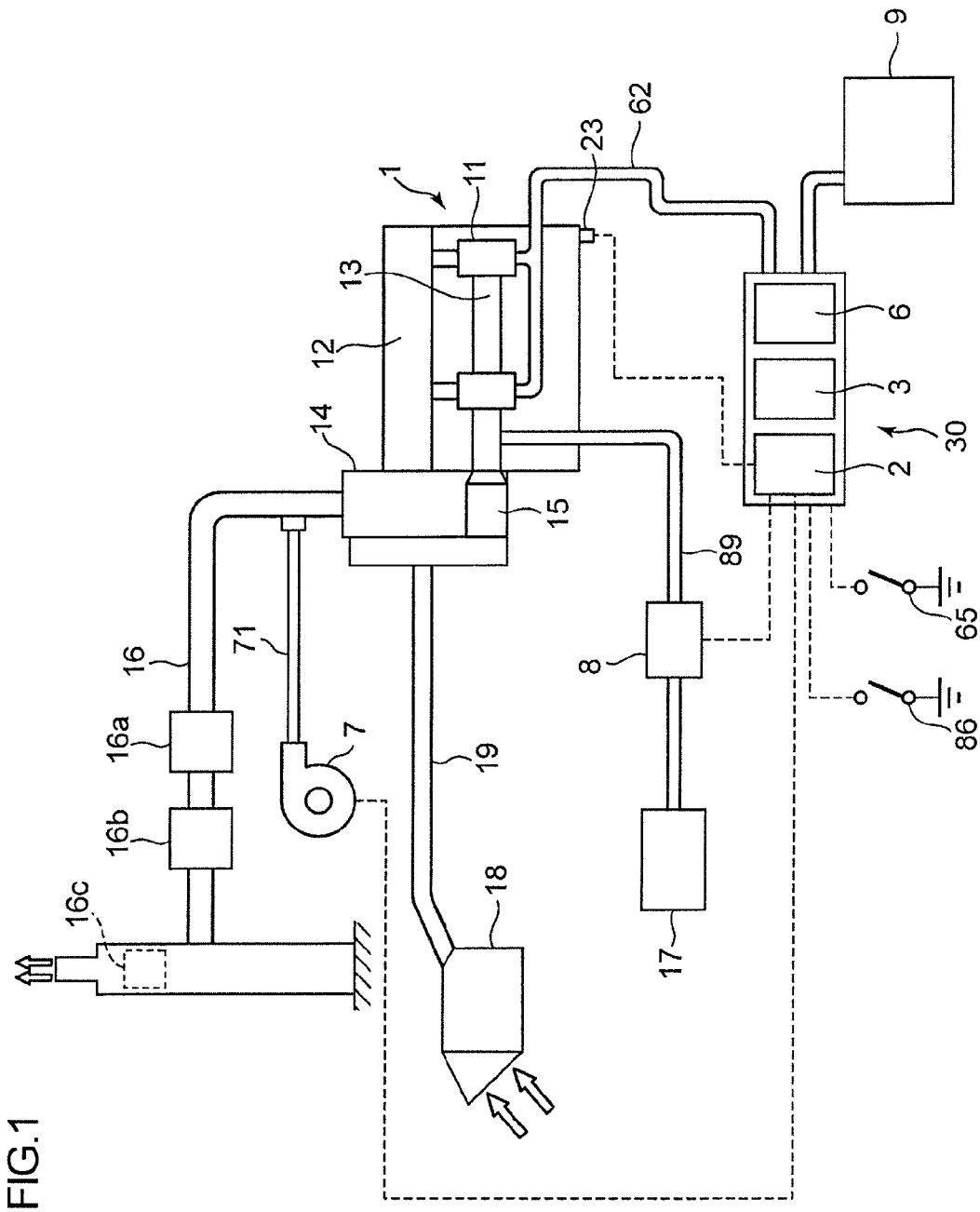
FIG. 1 is a schematic configuration diagram of an overview of a gas internal combustion engine according to an embodiment of the present invention.

With reference to FIG. 1, the overall configuration of a precombustion-chamber type lean premixed gas internal combustion engine (hereinafter, referred to in short as a gas engine) implementing the present invention will be described.

The gas engine 1 includes: an air starting device 30 coupled to the gas engine 1 via the first pipe 62; a compressed-air tank 9 for supplying compressed air to the air starting device 30; a turbocharger 14 mounted to an exhaust-air collecting pipe 12 of the gas engine 1; an exhaust channel 16 for discharging to the atmosphere exhaust gas having driven an exhaust turbine (not illustrated) of the turbocharger 14; an air cleaner 18 for removing dust contained in air that is to be supplied to the gas engine 1; an air cooler 15 coupled coaxially to the exhaust turbine for compressing supply air from the air cleaner 18 and cooling heated supply air; a fan and motor 7 for exhaust purge coupled to the exhaust channel 16 at the downstream side of the turbocharger 14 in the flow direction of exhaust gas via a blower pipe 71, for blowing air into the exhaust channel 16; a fuel-gas supply device 17 for supplying fuel gas to the gas engine 1; and a gas-leakage checking device 8 disposed in a fuel-gas supply pipe 89 disposed between the fuel-gas supply device 17 and a supply-air pipe 13, for checking gas leakage of safety shutoff valves.

In the exhaust channel 16, an oxidation catalyst 16b for oxidizing and detoxifying carbon monoxide (CO) and hydrocarbon (HC) contained in the exhaust gas, a denitration device 16c for decomposing nitrogen oxide (NOx) contained in the exhaust gas into harmless nitrogen and water by injecting ammonia (NH3) and using a catalyst so as to obtain clean exhaust gas, a PM filter 16a for removing suspended particulate matters contained in the exhaust gas (PM: particulate matter), and the like are disposed in accordance with the required specification of the device.

Thus, depending on the required specification of the exhaust-gas purification device to be mounted, the channel capacity of the exhaust channel 16 varies.

Further, 23 is a rotation-speed sensor for measuring the cumulative rotation speed of slow-air turning upon startup of the gas engine.

The air starting device 30 includes a control device 2 for controlling operation of the air starting device 30, a main air-starting unit 6 which increases the gas engine 1 to a rotation speed for startup of fuel-gas ignition operation, and a compressed-air supply unit 3 for performing slow-air turning for checking the inside of each cylinder of the gas engine 1 and securing lubrication between cylinders and pistons in the cylinders before operation of the main air-starting unit 6.

In the present embodiment, the control device 2 is a comprehensive control device which controls the air starting device 30, the fan and motor 7 for exhaust purge and the gas-leakage checking device 8.

The main air starting unit 6 introduces compressed air supplied from the main air starting unit 6 into each cylinder in accordance with an order of the ignition timing of the gas engine 1, and increases the gas engine 1 to the rotation speed for starting fuel-gas ignition operation with the pressure of the compressed air.

However, while the gas engine 1 is halted, leakage may occur from devices for gas-fuel supply and safety.

For instance, temporary deformation (elastic deformation) may occur to a seal portion due to an earthquake or the like, and fuel-gas may leak from the deformed part to accumulate in the exhaust channel 16.

Furthermore, non-combusted gas may accumulate in the exhaust channel 16 due to a failure in ignition upon startup, for instance.

In such a case, when air starting device 30 starts the gas engine 1, the compressed air used by the air starting device 30 may discharge the non-combusted gas in the gas engine 1 and the exhaust channel 16.

However, in a case where the capacity of the exhaust channel is large due to the installation specification of various exhaust gas purification devices disposed in the exhaust channel 16, the non-combusted gas may not be discharged adequately by the compressed air from the air starting device 30.

Further, in the present embodiment, before the air starting device 30 is operated, the gas-leakage checking device 8 disposed in the fuel-gas supply pipe 89 is manually started.

Figure 2:
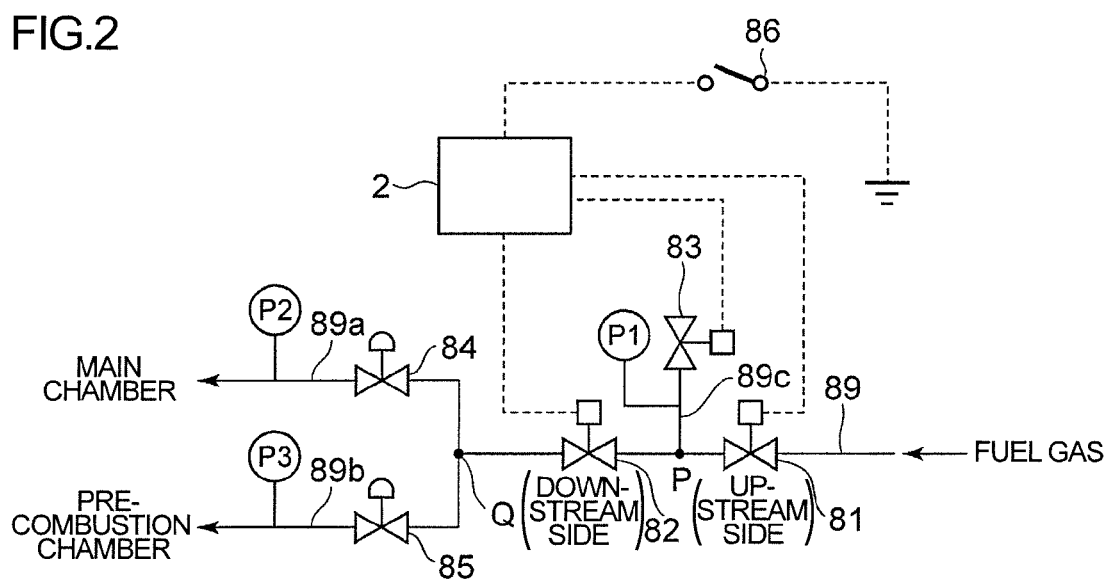
FIG. 2 is a schematic configuration diagram of a gas leakage checking device according to an embodiment of the present invention.

With reference to FIG. 2, the gas-leakage checking device 8 will be described.

The gas-leakage checking device 8 is disposed in the fuel-gas supply pipe 89 connecting the fuel-gas supply device 17 and the supply-air pipe 13.

The gas-leakage checking device 8 includes: the first safety shutoff valve 81; the second safety shutoff valve 82 disposed on the downstream side of the first safety shutoff valve 81 at a distance from the first safety shutoff valve 81; a gas-leakage checking pipe 89c branched from the fuel-gas supply pipe 89 at an intermediate point P between the first safety shutoff valve 81 and the second safety shutoff valve 82; a gas-discharge valve 83 for discharging to the atmosphere or shutting off fuel gas between the first safety shutoff valve 81 and the second safety shutoff valve 82, disposed on a distal end portion of the gas-leakage checking pipe 89c; the first pressure meter P1 disposed in the gas-leakage checking pipe 89c between the point P and the gas-discharge valve 83; a main-chamber supply pipe 89a for introducing fuel gas to the main chamber of the combustion chamber at a point Q on the downstream side of the second safety shutoff valve 82; a precombustion chamber supply pipe 89b for introducing fuel gas to the precombustion chamber of the combustion chamber; a main pressure-adjustment valve 84 for adjusting the flow rate of the fuel gas to the main chamber, disposed in the main-chamber supply pipe 89a; the second pressure meter P2 disposed on the downstream side of the main pressure-adjustment valve 84; an auxiliary pressure-adjustment valve 85 for adjusting the flow rate of the fuel gas to the precombustion chamber, disposed in the precombustion-chamber supply pipe 89b; the third pressure meter P3 disposed on the downstream side of the auxiliary pressure-adjustment valve 85; the control device 2 which opens and closes each of the first safety shutoff valve 81, the second safety shutoff valve 82, and the gas-discharge valve 83 in a set order; and a gas-leakage checking S/W 86, which is a starting switch that starts the control device 2. The above are arranged in this order from the upstream side of the fuel-gas supply pipe 89 with respect to the flow direction of the fuel gas.

Figure 3:
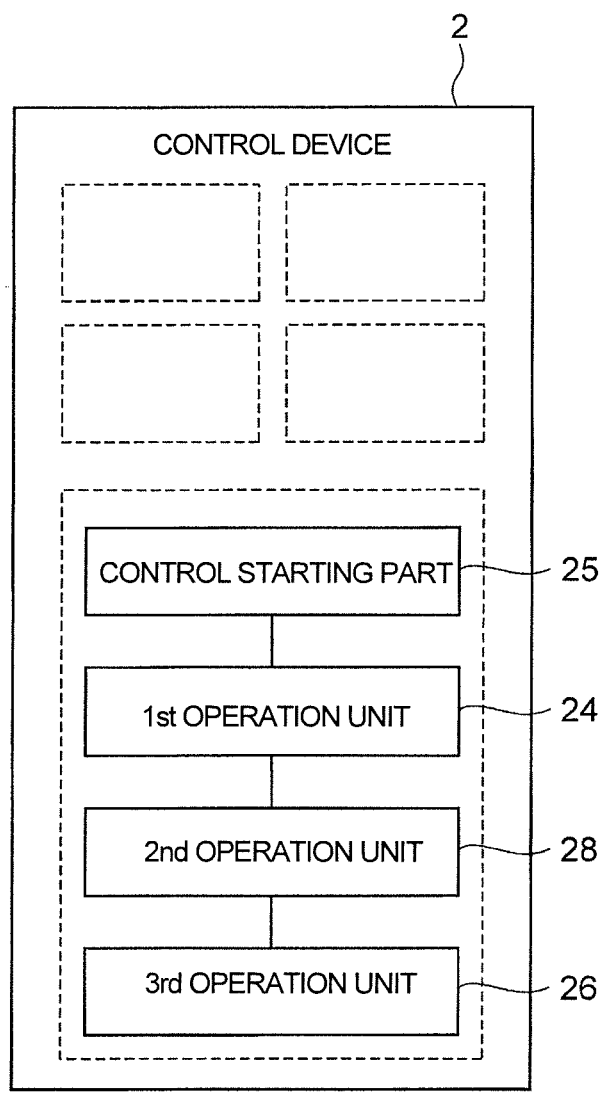
FIG. 3 is a configuration diagram of a gas leakage control part according to an embodiment of the present invention.
Figure 5:
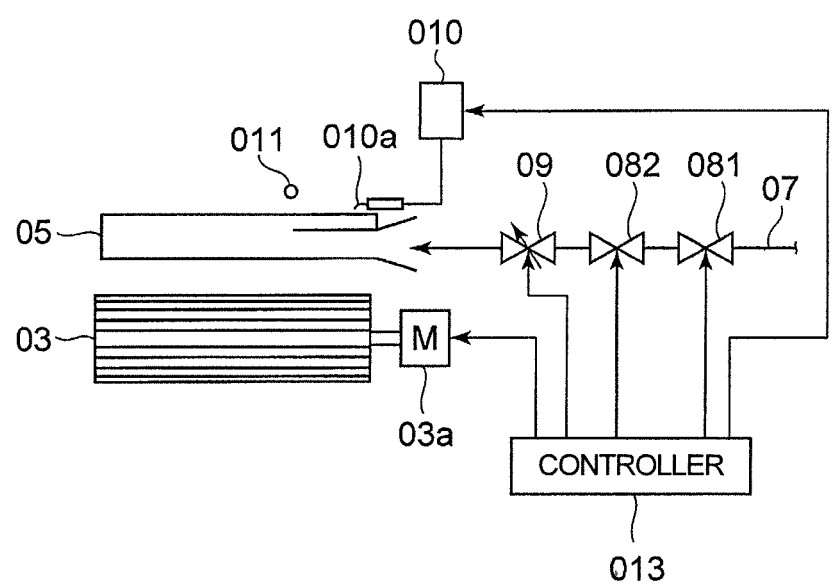
FIG. 5 is an explanatory diagram of a conventional technique.

As illustrated in FIG. 3, the control device 2 includes a control starting part 25, the first operation unit 24, the second operation unit 28, and the third operation unit 26.

The control starting part 25 starts the control device 2 when the gas leakage checking S/W 86 is turned on.

The first operation unit 24 checks leakage of fuel gas of the first safety shutoff valve by closing only the gas-discharge valve 83 in a state where the first and second safety shutoff valves 81, 82 are closed and the gas-discharge valve 83 is open.

The second operation unit 28 checks leakage of fuel gas of the second safety shutoff valve 82 and the gas-discharge valve 83 by maintaining the second safety shutoff valve 82 and the gas-discharge valve 83 to be closed and opening the first safety shutoff valve 81, in a state of the first operation unit 24.

The third operation unit 26 checks leakage of fuel gas of the first safety shutoff valve 81, the second safety shutoff valve 82, and the gas-discharge valve 83 by maintaining the second safety shutoff valve 82 and the gas-discharge valve 83 to be closed and closing the first safety shutoff valve 81 from an opened state.

With reference to FIG. 4, a gas-leakage checking method of the first safety shutoff valve 81, the second safety shutoff valve 82, and the gas-discharge valve 83 constituting the gas-leakage checking device 8 will be described.

First, before operation of the air starting device 30, the gas-leakage checking S/W (switch) 86 of the gas-leakage checking device 8 is switched on manually.

The control device 2 operates the gas-discharge valve 83 from an open state to a closed state in the first operation step (automatically operated by the control device 2) illustrated in FIG. 3.

The gas engine 1 maintains the gas-discharge valve 83 to be open during shutdown so that the fuel gas does not leak into the gas engine 1.

Thus, when the gas-discharge valve 83 is operated from the open state to the closed state, the first safety shutoff valve 81 and the second safety shutoff valve 82 are both in a closed state.

Furthermore, the pressure between the first safety shutoff valve 81 and the second safety shutoff valve 82 is the atmospheric pressure.

In this state, if the first, second, and third pressure meters P1, P2, P3 all show no change, it means that the fuel gas accumulating on a side of the first safety shutoff valve 81 that is closer to the fuel-gas supply device 17 is not leaking to the downstream side from the first safety shutoff valve 81.

Further, also in a case where the second and third pressure meters P2, P3 show no change, whether gas is leaking cannot be determined because the fuel-gas pressure is not applied to the second safety shutoff valve 82 and the gas-discharge valve 83 (marked as Δ).

Thus, it is possible to determine that there is no gas leakage at the first safety shutoff valve 81 (marked as o).

If the first pressure meter P1 shows a pressure increase, and the second and third pressure meters P2, P3 show no change, it means that gas is leaking at the first safety shutoff valve 81 (marked as χ), and gas is not leaking at the second safety shutoff valve 82.

Further, gas leakage of the gas-discharge valve 83 cannot be determined at this point of time because the pressure of the first pressure meter P1 increases when the amount of leakage is small with respect to the amount of gas leakage of the first safety shutoff valve 81.

Further, if the pressures of the first, second, and third pressure meters P1, P2, P3 all increase, gas is leaking at both of the first and second safety shutoff valves 81, 82, and gas leakage cannot be determined for the gas-discharge valve 83 at this point of time.

If the amount of leakage of the first safety shutoff valve 81 is larger than the amount of leakage of the gas-discharge valve 83, the pressures of the first, second, and third pressure meters P1, P2, P3 all increase.

In the second operation step, the first safety shutoff valve 81 is operated from a closed state to an open state.

In this state, the pressure of the fuel gas accumulating at the upstream side of the first safety shutoff valve 81 acts on the second safety shutoff valve 82 and the gas-discharge valve 83.

Thus, the fuel-gas pressure at the upstream side of the first pressure meter P1 is applied to the first pressure meter P1, and thus the pressure of the first pressure meter P1 increases. If the second and third pressure meters P2, P3 show no change, the second safety shutoff valve 82 and the gas-discharge valve 83 are determined to be not having gas leakage.

In this case, the reading (pressure) of the first pressure meter P1 is a gas supply pressure. If the pressure of the first pressure meter P1 once increases and then decreases while the pressures of the second and third pressure meters P2, P3 increase, it is determined that at least the second safety shutoff valve 82 has gas leakage.

Further, if the pressure of the first pressure meter P1 decreases while the pressures of the second and third pressure meters P2, P3 do not change, it is determined that the gas-discharge valve 83 has gas leakage.

In the third operation step, the first safety shutoff valve 81 is operated from an open state to a closed state.

As a result, fuel gas is trapped between the first and second safety shutoff valve 81, 82 and the gas-discharge valve 83 (the fuel gas pressure is maintained).

If there is no change in the first, second, and third pressure meters P1, P2, P3, it is determined that there is no gas leakage in the first and second safety shutoff valves 81, 82 and the gas-discharge valve 83.

Further, if the pressure of the first pressure meter P1 decreases and the second and third pressure sensors P2, P3 show no change, there is no leakage at the first safety shutoff valve 81, and there is no leakage from the second safety shutoff valve 82 toward the second and third pressure meters P2, P3, and thus it is determined that gas is leaking at the gas-discharge valve 83.

Further, if the pressure of the first pressure meter P1 decreases while the pressures of the second and third pressure meters P2, P3 increase, it is determined that the first safety shutoff valve 81 and the gas-discharge valve 83 are shut off (no gas leakage) and the second safety shutoff valve 82 has gas leakage.

Assuming that gas is leaking at the gas-discharge valve 83, there is no supply of fuel gas (leakage) from the first safety shutoff valve 81, and thus the fuel gas between the first and second safety shutoff valves 81, 82 and the gas-discharge valve 83 has its pressure reduced and does not flow to the second and third pressure meters P2, P3.

Accordingly, in this case, it is possible to determine that gas is not leaking at the gas-discharge valve 83.

As described above, pressure meters are provided to check gas leakage according to the above procedure so that double or triple cross check is performed to determine gas leakage of the first and second safety shutoff valves 81, 82 and the gas-discharge valve 83, which makes it possible to prevent in advance an unpredictable trouble due to gas leakage.

In the present embodiment, the gas leakage checking S/W 86 serving as a starting switch starts the control device 2 to open and close each of the first safety shutoff valve 81, the second safety shutoff valve 82, and the gas-discharge valve 83 in a set order. However, a similar effect can be achieved by manually performing the operation steps 1 to 3 on each of the first safety shutoff valve 81, the second safety shutoff valve 82, and the gas-discharge valve 83.

In this way, leakage of fuel gas is checked by double cross check for the first safety shutoff valve 81, the second safety shutoff valve 82, and the gas-discharge valve 83, which makes it possible to detect whether non-combusted gas is accumulating in the gas engine 1 and the exhaust channel 16 after the gas engine is halted and then restarted by ignition, thereby providing a starting device for a gas internal combustion engine whereby it is possible to improve safety, breakage prevention and durability and reliability of the gas engine 1 are improved.

INDUSTRIAL APPLICABILITY

The present invention is suitably applied to a starting device for a gas internal combustion engine equipped with a slow air turning device that is operated before startup of an internal combustion engine including an air starting device.

DESCRIPTION OF REFERENCE NUMERALS

1 Gas internal combustion engine (precombustion-chamber type lean premixed gas internal combustion engine)
2 Control device
3 Compressed-air supply unit
6 Main air starting unit
7 Exhaust purge fan
8 Gas-leakage checking device
16 Exhaust channel
17 Fuel-gas supply device
24 First operation unit
25 Control starting part
26 Third operation unit
28 Second operation unit
30 Air starting device
81 First safety shutoff valve
82 Second safety shutoff valve
83 Gas-discharge valve
89 Fuel gas supply pipe
89a Main chamber supply pipe
89b Precombustion chamber supply pipe
89c Gas discharge checking pipe
P1 First pressure meter
P2 Second pressure meter
P3 Third pressure meter

The invention claimed is:

1. A gas-leakage checking device for a gas internal combustion engine, comprising:
a fuel-gas supply pipe to supply fuel gas to a combustion chamber of the gas internal combustion engine;
a first safety shutoff valve disposed in the fuel-gas supply pipe to permit or to shut off a flow of the fuel gas;
a second safety shutoff valve disposed in the fuel-gas supply pipe on a downstream side of the first safety shutoff valve at a distance from the first safety shutoff valve;
a gas-leakage checking pipe branched from the fuel-gas supply pipe between the first safety shutoff valve and the second safety shutoff valve;
a gas-discharge valve disposed in the gas-leakage checking pipe to discharge the fuel gas between the first safety shutoff valve and the second safety shutoff valve to atmosphere;
a first pressure meter disposed on an upstream side of the gas-discharge valve to detect a pressure of the fuel gas;
a second pressure meter disposed on a downstream side of the second safety shutoff valve to detect the pressure of the fuel gas in the fuel-gas supply pipe;
a control device to open and close the first safety shutoff valve, the second safety shutoff valve, and the gas-discharge valve in a set order; and
a starting switch to start the control device, wherein the control device is to operate based, at least in part, on operation of the starting switch, the control device to perform:
a first operation unit to check fuel-gas leakage of the first safety shutoff valve;
a second operation unit to check the fuel-gas leakage of the second safety shutoff valve and the gas-discharge valve; and
a third operation unit to check the fuel-gas leakage of the first safety shutoff valve, the second safety shutoff valve, and the gas-discharge valve, in sequence.

2. The gas-leakage checking device for a gas internal combustion engine according to claim 1,
wherein the gas internal combustion engine comprises a precombustion-chamber type lean premixed gas internal combustion engine, the fuel-gas supply pipe to be branched at a downstream side of the second safety shutoff valve into a main-chamber supply pipe to supply the fuel gas to a main chamber of the combustion chamber and a precombustion-chamber supply pipe to supply the fuel gas to a precombustion chamber of the combustion chamber, and the second pressure meter to include a main pressure meter and an auxiliary pressure meter,
wherein the main-chamber supply pipe includes a main pressure-adjustment valve to adjust the pressure of the fuel gas supplied to the main chamber, the main pressure meter to be disposed on a downstream side of the main pressure-adjustment valve, and
wherein the precombustion-chamber supply pipe includes an auxiliary pressure-adjustment valve to adjust the pressure of the fuel gas to be supplied to the precombustion chamber, the auxiliary pressure meter to be disposed on a downstream side of the auxiliary pressure-adjustment valve.

3. A method of checking gas leakage of a gas internal combustion engine, the gas internal combustion engine to include: a fuel-gas supply pipe to supply fuel gas to a combustion chamber of the gas internal combustion engine; a first safety shutoff valve disposed in the fuel-gas supply pipe; a second safety shutoff valve disposed on a downstream side of the first safety shutoff valve at a distance from the first safety shutoff valve; a gas-discharge valve disposed between the first safety shutoff valve and the second safety shutoff valve to discharge the fuel gas between the first safety shutoff valve and the second safety shutoff valve; a first pressure meter disposed on an upstream side of the gas-discharge valve to detect a pressure of the fuel gas; a second pressure meter disposed on a downstream side of the second safety shutoff valve to detect the pressure of the fuel gas in the fuel-gas supply pipe; and a gas-leakage checking switch to start a gas-leakage checking device,
the method comprising:
switching on the gas-leakage checking switch before startup of a starting device for the gas internal combustion engine;
a first operation of checking fuel-gas leakage of the first safety shutoff valve by operating the gas-discharge valve from an open state to a closed state and maintaining the first and second safety shutoff valves to be in a closed state;

a second operation of checking the fuel-gas leakage of the second safety shutoff valve and the gas-discharge valve by operating the first safety shutoff valve from a closed state to an open state and maintaining the second safety shutoff valve and the gas-discharge valve to be in a closed state; and a third operation of checking the fuel-gas leakage of the first safety shutoff valve, the second safety shutoff valve, and the gas-discharge valve by operating the first safety shutoff valve from an open state to a closed state and maintaining the second safety shutoff valve and the gas-discharge valve to be in a closed state, wherein the first operation, the second operation, and the third operation are performed in sequence in response to the operation to switch on the gas-leakage checking switch.

* * * * *